United States Patent [19]
Alafandi et al.

[11] 4,085,069
[45] * Apr. 18, 1978

[54] HYDROTHERMALLY STABLE CATALYSTS CONTAINING AMMONIUM FAUJASITE ZEOLITES

[75] Inventors: Hamid Alafandi, Woodland Hills; Dennis Stamires, Newport Beach, both of Calif.

[73] Assignee: Filtrol Corporation, Los Angeles, Calif.

[*] Notice: The portion of the term of this patent subsequent to Nov. 15, 1994, has been disclaimed.

[21] Appl. No.: 718,166

[22] Filed: Aug. 27, 1976

Related U.S. Application Data

[63] Continuation-in-part of Ser. No. 718,167, Sep. 9, 1976.

[51] Int. Cl.$^2$ ............................................. B01J 29/06
[52] U.S. Cl. ................................................. 252/455 Z
[58] Field of Search ..................... 252/455 Z; 423/112

[56] References Cited

U.S. PATENT DOCUMENTS

| | | | |
|---|---|---|---|
| 3,227,660 | 1/1966 | Hansford | 252/455 Z |
| 3,304,254 | 2/1967 | Eastwood et al. | 252/455 Z |
| 3,557,024 | 1/1971 | Young et al. | 252/455 Z |
| 3,677,698 | 7/1972 | Sherry et al. | 252/455 Z |

*Primary Examiner*—Carl F. Dees
*Attorney, Agent, or Firm*—Subkow and Kriegel

[57] ABSTRACT

Catalysts containing a matrix and an ammonium zeolite of the faujasite type produced by exchanging the zeolite whose exchange sites are substantially entirely occupied by Na cations, with an ammonium salt solution to exchange substantially all of the Na cations with $NH_4$ cations with substantially no impairment of crystallinity by a control of the relation of the equivalents of $NH_4$ in the solution to equivalents of Na in the zeolite.

18 Claims, No Drawings

HYDROTHERMALLY STABLE CATALYSTS CONTAINING AMMONIUM FAUJASITE ZEOLITES

BACKGROUND OF THE INVENTION

This application is a continuation-in-part of copending application Ser. No. 718,167 filed Sept. 9, 1976, Attorney Docket 2951.

This invention relates to thermally stable zeolites particularly zeolites of the faujasite type which have superior thermal and hydrothermal stability, and catalysts produced employing the same. Faujasite type zeolites have been widely employed in catalytic processes such as processes for the conversion of hydrocarbons and are generally well known. The patent and journal literature is extensive.

In all of these catalyst systems the faujasite type zeolites are produced in the sodium form, that is, the various exchange sites are satisfied by sodium. Such zeolites are described in U.S. Pat. Nos. 2,882,244, usually referred to as zeolite, and 3,216,789 referred to as a Y zeolite, and also in 3,446,727.

The cracking process operates at two levels of temperature. The catalyst is in contact with hydrocarbon vapor to be converted at a relatively high temperature. In this process, the catalyst becomes contaminated with carbon and high-boiling hydrocarbons. In order to remove the contaminants, the catalyst is subjected to regeneration before it is returned to the cracking zone. The catalyst is purged with steam to remove hydrocarbon vapors and introduced into a regeneration zone where the carbon and hydrocarbons in the catalyst are burned by hot air introduced into the regeneration zone. The regeneration temperature is many degree higher than the reaction temperature. The regenerated catalyst is returned to the reaction zone. The zeolite component of the prior art catalysts loses a substantial portion of its crystallinity and activity under these conditions.

In order to test the activity of the catalyst, it is the practice in the catalytic-cracking art to measure the catalyst activity by a bench-scale test.

The activity test known as the microactivity test has been adopted in this art as a test of the activity of the catalyst. (See Oil and Gas Journal, 1966, Vol. 64, No. 39, pp. 7, 84, 85; and Nov. 22, 1971, pp. 60-68).

In order to test the thermal stability of the catalyst and, therefore, its resistance to the high temperature and steam conditions encountered in commercial cracking operations, it is subjected to high-temperature steam treatment prior to being subjected to the bench-scale tests. Originally, when the catalysts were regenerated under conditions of moderate severity, the catalysts were tested by subjecting them to steam at 1350° F. for 4 hours. (See U.S. Pat. Nos. 2,035,463 and 3,446,727). Subsequently, the temperature of the steaming was increased to 1450° F. for 2 hours. This method is referred to in this specification as M steaming. As the regenerator temperature of the commercial cracking process became more severe, it was found that the temperature of steaming prior to testing should be increased to 1500° F. for 2 hours (S steaming) in order for the bench-scale test to give results which would be commercially meaningful.

To be representative of the still higher regeneration temperatures of modern catalytic cracking units, the steaming conditions are made even more severe. A temperature of 1550° F. for 2 hours (S+ steaming) prior to testing for catalysts was found to be more nearly representative of the effect of the regeneration operation in these more modern cracking operations. This steam pretreatment is referred to in this application as S+ steaming and the activity of the steamed catalyst as S+ activity, i.e. the % conversion of the feed by the above microactivity test.

To produce useful catalysts the sodium content must be reduced and this is accomplished by exchange with cations such as alkaline earth and rare earth cations. Commonly the sodium content of the zeolites employed in catalysts are exchanged with polyvalent cations to Na content on the order of about 3 to about 5% expressed as $Na_2O$ (see U.S. Pat. No. 3,466,727). The difficulty with such catalysts are that they have inferior hydrothermal stability. For example, the S+ activity of such catalysts is of the order of about 20% although the M activity may be about 75%. When such zeolites are incorporated in a matrix, and introduced into the catalytic processes, they are subjected to a cycle of hydrocarbon conversion and regeneration at high temperatures in the presence of steam. Their activity as indicated above is depreciated.

The prior art relating to the production of such low sodium zeolites of the faujasite type is extensive and the following patents are illustrative: Maher et al U.S. Pat. Nos. 3,293,192 and 3,402,996; Hansford 3,354,077; Sherry 3,677,698.

The so-called ultra-stable catalyst of the prior art are produced by first exchanging the zeolite at temperatures up to the boiling point of the solution of the salt whose cation is desired to be introduced into the zeolite to replace the sodium of the zeolite and subsequently, calcine in air or in the presence of steam to place the remaining sodium not previously exchanged in position so that it may be further exchanged. By this procedure, the sodium content of the zeolite may be reduced by 1% or less expressed as $Na_2O$.

Maher et al supra exposes the zeolite to dry calcination temperatures of 1000° F and Ward, U.S. Pat. Nos. 3,781,199 and 3,867,277 carries out the calcination in the presence of steam.

The resultant zeolite is profoundly altered in crystal structure as is evidenced by substantial change of the $a_o$ lattice constant, see Maher et al supra.

STATEMENT OF THE INVENTION

We have discovered that contrary to the teachings of the prior art we can, without a prior reduction of the sodium content of a sodium zeolite of the faujasite type, before exposing the zeolite to a high temperature, reduce the sodium content by more than 85% and up to 96% of the original sodium content of the faujasite.

We have found that by the process of our invention we may cause the aforesaid reduction in the sodium content of the zeolite, and also this occurs without any substantial change in the crystallinity either in lattice constant or the degree of crystallinity.

The exchanged Y zeolites having the $a_o$ lattice constant characteristic of the Y zeolites i.e. in the range of about 24.7 to about 24.5 Angstroms (see U.S. Pat. No. 3,130,007), produced by the process of our invention has substantially increased hydrothermal stability and when incorporated into matrices in place of zeolites of the prior art of like Na content, will result in catalysts of much greater thermal stability to give substantially superior S+ activities.

We accomplish this result by exchanging the zeolite of the faujasite type by a process of hydrothermal exchange of the sodium in the faujasite zeolite at a temperature far in excess of the temperatures of the boiling point of the reaction solution at atmospheric pressure. This temperature is attained by maintaining the reaction mixture during the entire exchange reaction between the zeolite and exchange solution at superatmospheric pressures. The resultant zeolite is incorporated into a matrix as will be described below.

In the process according to our invention, the sodium zeolites of the faujasite type is mixed with a solution of a salt of a cation to be exchanged for the sodium of the zeolite and the exchange process is carried out at superatmospheric pressure so as to cause the exchange to occur at temperatures above 300° F. We have found that temperature substantially below this lower limit or above about 500° F. during the exchange process will result in an inferior product as will be set forth below. We have also found that in order to produce the zeolites of low sodium level, for example, in the range of 1% or less, expressed as $Na_2O$ based upon the weight of the volatile free (VF) zeolite without a substantial destruction of the crystallinity of the zeolite, it is desirable to maintain the ratio of the equivalents of the exchange cation to the sodium in the zeolite within a specified range depending upon the nature of the cation.

While the process of our invention may be carried out using any exchange cation, such as have been used in exchanging the sodium zeolites for use in catalysts, for example, ammonium, hydrogen, polyvalent cations such as alkaline earth, nickel, cobalt, molybdenum or rare earth cations, we prefer to employ an acid solution of an ammonium salt of a strong acid, for example, ammonium chloride or ammonium nitrate or ammonium sulfate.

The Y zeolite which is exchanged in the process of our invention is one which contains the Na present as cations when it is produced by the processes as described in the said U.S. Pat. No. 3,130,007, or application Ser. No. 696,889 filed June 17, 1976 of which one of us is an applicant. Said application is herein incorporated by this reference. The Y zeolite has a lattice constant $a_o$ in the range of about 24.7 to about 24.5 angstroms (see U.S. Pat. No. 3,130,007), has a silica to alumina ratio in the range of 3 or more, usually up to about 6. The sodium content is usually in the range of $0.9 \pm 0.2$ per mol of the zeolite expressed as:

$0.9 \pm 0.2\ Na_2O.Al_2O_3.3-6\ SiO_2$.

Due to variations in the reactants and other parameters of the reaction, as well as the uncertainty in the analytic procedures, the value of the components of the constitutional formula may not be more accurately stated. We wish to exchange the Y zeolite as produced with its original Na content. Where we refer to the sodium Y (NaY) which is charged to the exchange reaction of our invention, we mean the product as produced which has not undergone an exchange reaction to reduce the original sodium content in any substantial degree.

The temperature should be above 300°, and less than 500° F. and preferably between 350° and 450° F., and the ratio of the equivalents of ammonium cation, in the solution employed, to the equivalents of sodium originally in the zeolite charged to the reaction mixture, depends on the level of the residual Na. We prefer to carry out the reaction for exchange to levels of Na as $Na_2O$ of about 1% or less, within the range of 30 to 40 equivalents of ammonium ion per equivalent of sodium ion in the zeolite employed in the reaction mixture. We may obtain this ratio by adjusting the concentration of the zeolite solids in the reaction mixture and the concentration of the ammonium salt. We have found that there is no substantial increase in the degree of exchange by increasing the concentration of ammonium ion or zeolite to give a ratio of the ammonium ion equivalents per equivalent of sodium ion of more than about 40.

We have also found that it is desirable to carry out the exchange in an acid condition, suitably a pH in the range of about 2½ to about 5, for example, a pH between 3 and 4.

Under these conditions we have been able to obtain a Y zeolite having the silica to alumina ratio and $a_o$ characteristic of the Y zeolites as herein described, with sodium expressed as $Na_2O$ based on the exchanged zeolite, volatile free for example, from about 3 to less than 1%. The process does not result in any substantial impairment of the crystallinity of the exchanged zeolite, and we may obtain an ammonium Y which analyzed as above.

The crystallinity of the exchanged zeolite was substantially the same as the crystallinity of the sodium Y as evidenced by their X-ray patterns with substantially the same $a_o$ value as the Y entering the exchange process, to wit, with $a_o$ in the range of 24.7 to 24.5 angstroms depending on the $a_o$ of the NaY entering the exchange process, and with but minor reduction in surface area. The resultant product shows excellent thermal and hydrothermal stability.

The catalyst of our invention is produced by mixing the zeolite of the faujasite type which has been exchanged according to our invention as described herein, with ammonium salt solution to produce an ammonium zeolite containing Na expressed as $Na_2O$ of the range of from about 2.5% to about 0.5% on a volatile free basis with any of the matrices of the prior art catalysts, such as alumina hydrate, silica sol, silica gel, silica alumina gel or other oxide gels, clays. We prefer to employ as the matrix a mixture of pseudoboehmite, and clay.

In our preferred embodiment the ratio of the components in the catalyst are from 10 to 30 parts by weight of the ammonium Y zeolite, 10 to 30 parts by weight of alumina and from 20 to 70 parts by weight of kaolin such as ball clay, acid treated halloysite and mixtures of said clays, the parts all adding to 100 parts by weight. The percentages are on a volatile free basis.

The catalyst of our inventions are characterized in that they are thermally stable in that their S+ activity above about 40% and preferably about 45 or higher, and that the average of the catalyst produced according to our invention will have average S+ activity in the range of about 45% to 65%.

The catalyst is produced by spray drying a slurry of the above zeolite, the alumina as hydrated alumina and clay, the slurry composition being such as to give a spray dried product of the above composition.

The hydrated alumina in the form of pseudoboehmite which we prefer to use includes a substantial proportion above 25% and preferably substantially entirely a gelatinous aluminum monohydrate AlOOH. The X-ray pattern of the pseudoboehmite shows a broad peak in the range of 10° to 18° peaking at 13.5° in a pattern produced from copper K alpha radiation. (For further details of the composition and crystal structure, see Karl Wafers and Gordon M. Bell, Technical paper No. 19, Alcoa Research Laboratories, 1972, pp. 11 et seq.).

The process of Example 1 of U.S. Pat. No. 2,935,463 is reported in said patent to produce a product containing a hydrated alumina gel, identified as boehmite and crystalline alumina trihydroxides. The gel type of boehmite is here identified as pseudoboehmite. Other types of pseudoboehmites are commercially available, such as hereinafter described. These forms are substantially free of crystalline aluminum trihydroxides.

Pseudoboehmites may be formed by other procedures. (See Technical Paper No. 19 and U.S. Pat. No. 2,935,463). We prefer to employ a pseudoboehmite which is substantially free of Na cations.

In formulating our catalyst, we have used as typical of the zeolite, a silicated clay produced according to Example 2 of the aforesaid U.S. Pat. No. 3,446,727 from acid treated clay. Instead of an acid-treated clay as in the above example, a kaolin which has been calcined sufficiently to destroy its crystallinity as evidenced by its X-ray pattern is employed.

In order to obtain a faujasite-type zeolite having an $SiO_2/Al_2O_3$ ratio in excess of 4, the components are adjusted to increase the $SiO_2$ to $Al_2O_3$ ratio in the reaction. The solution is mixed with calcined kaolin. The reaction temperature is held at about 60° to 75° F. for a period of about 4 days. The clay mixture, after this low temperature digestion step, is heated with live steam until crystallization is complete. The ratios and compositions given above are merely exemplary. Variation of the components and of the times and temperatures, as is usual in commercial operations, will produce silicated clay having $SiO_2/Al_2O_3$ mol ratios varying from about 4 to about 5.

The product shows an X-ray pattern containing peaks which correspond to the faujasite pattern.

The pseudoboehmite is improved for use in the composition by acidification (peptization), preferably with formic acid. One part by weight of pseudoboehmite calculated as volatile free is mixed by relatively mild agitation with about 1.0 parts by weight of a water solution containing about 1 to 1.5% by weight of formic acid per gram of solution and then for 30 minutes with vigorous agitation. The addition of the acid in amounts greater than about 3% by weight of acid results in impairing the utility of the pseudoboehmite as a component in the catalyst of our invention. Other peptizing agents, such as $HNO_3$, phosphoric acid, and acetic acid of like hydrogen ion concentration may be used.

The peptized pseudoboehmite is dispersed in water and the clay mixed therein with vigorous agitation and the exchanged zeolite is mixed into the slurry and spray dried. The spray dried pellets have a mean particle size of about 70 to 80 microns.

The following examples illustrate our preferred procedure for producing the catalysts of our invention and the ammonium zeolite to be employed therein.

EXAMPLE 1

The sodium Y charged to the exchange, analyzed as 14.1% $Na_2O$ on a volatile free basis (VF), and a silica to alumina ratio of 4.4 (calculated as 0.97 $Na_2O.Al_2O_3.4.4$ $SiO_2$) and an $a_o$ of 24.67 was dispersed in 1400 ml of a solution containing 1400 grams of ammonium nitrate, anhydrous basis, equivalent of 13 equivalents of $NH_4$ ion per liter.

The analytical results as well as the $a_o$ lattice constant indicated that substantially all of the exchange sites were occupied by sodium. The slurry contained 100 grams, volatile free, of the above sodium Y (containing 0.455 equivalents of Na) to give a solids content of 6.6% and a ratio of equivalents of ammonium cation in the solution per equivalent of the sodium cation in the zeolite of 40. To this mixture was added sufficient nitric acid to bring the solution to a pH of 3.5. The mixture was heated in an autoclave under autogenous pressure to a temperature of 350° F for 6 hours. The mixture after cooling was filtered and the solids were washed with distilled water substantially free of nitrate anions.

The product analyzed on a volatile free basis had the following composition:

$Na_2O$ = 0.5% by weight
$NH_3$ = 7.5% by weight
$Al_2O_3$ = 23.5% by weight
$SiO_2$ = 61.0% by weight The unit cell composition calculated from said values is as follows: $Na_2 (NH_4)_{56} H_3 [AlO_2]_{61} [SiO_2]_{131}$ and its constitutional formula:

$[(Na)_{0.02} (NH_4)_{0.91} \cdot (H)_{0.07}] 1.Al_2O_3.4.4\ SiO_2$

The $a_o$ of the ammoniun zeolite is the same as that of the aforesaid NaY to wit, 24.67.

EXAMPLE 2

A sample of the sodium Y such as used in Example 1, and which has been exchanged by conventional exchange at ordinary temperatures, i.e. below 100° C, with ammonium ion to a sodium content of 3% by weight expressed as $Na_2O$ on a volatile free basis, and which showed the crystallinity pattern of Y was calcined at 1000° F., and a separate sample of the same exchange zeolite was calcined at 1600° F. both for 3 hours in air. The sample calcined at 1000° F. retained its crystallinity but the sample which is calcined at 1600° F was amorphous showing no peaks on its X-ray pattern. The sample produced, according to Example 1, was similarly calcined at the above two temperatures and showed in each case excellent crystallinity as evidenced by X-ray pattern with good well formed peaks of intensity substantially similar to that of the uncalcined product.

EXAMPLE 3

The thermal stability of the exchanged zeolite produced, according to the process of our invention, is further illustrated by the relatively small change in the surface area of the exchanged zeolite as the temperature of calcination is increased. Various samples of zeolite exchanged according to the process of our invention, according to the procedure set forth in Example 1, in which the NaY has been reduced to $Na_2O$ content of 0.6% expressed as above, was divided into several samples and separately calcined in air at temperatures of between 1000° to 1600° F. for the same period of time. The following Table 1 reports the temperature of calcination and the surface of the calcined product.

TABLE 1

| Temperature ° F | Surface Area* |
|---|---|
| 1000 | 572 |
| 1200 | 521 |
| 1400 | 564 |
| 1490 | 516 |
| 1600 | 470 |

The surface area is reported in Table 1 as square meters per gram employing the method described in the article by P. H. Emmett in "Advances in Catalysis", Vol. 1, 1948, pp. 64–89, Academic Press, N.Y.

As is shown in Example 2, the zeolite of 3% Na₂O had lost its crystallinity when heated to 1600° F (871° C).

The improvement in the thermal stability of the ammonium zeolite exchanged according to the process of our invention, and resulting from the reduction of the sodium in the zeolite below about 1% Na₂O, is evidenced by the increase in the temperature required to cause a phase change in the zeolite.

EXAMPLE 4

Four samples were produced by the procedure of Example 1 to reduce the sodium to levels shown below by adjusting the concentration of the ammonium salt and the solids in the slurry as well as the temperature and duration of exchange. The zeolites having the following sodium content as shown in Table 2. The samples were subjected to a standard differential thermal analysis, and the 900° C exotherm peak determined. The results are given in the following Table 2.

TABLE 2

| Sample | % Na₂O VF | DTA ° C |
|---|---|---|
| 1 | 3.2 | 925 |
| 2 | 2.6 | 952 |
| 3 | 1.7 | 965 |
| 4 | 0.6 | 975 |

The substantial increase in the temperature required to cause a transformation of the zeolite into what is believed to be mullite, is evidenced from the Table.

EXAMPLE 5

The thermally and hydrothermally stabilized zeolite produced according to the process of our invention (see below Sample 1), show a large decrease in the pores of 35 less than 45 Angstrom and a large increase in the pores of greater than 600° Angstrom. Sample 1 as produced by the process of Example 1 to reduce the Na to the Na₂O content of about 0.5%, was calcined at 1000° F. for 2 hours and then steamed at 1490° F. for over 3 hours. Sample 2 is the original sodium Y employed in Example 1.

TABLE 3

| | Total PV* cm³/gram | % PV* 600 A diameter | % PV* 45 A diameter | SA** M²/gram |
|---|---|---|---|---|
| | 0.54 | 24 | 48 | 565 |
| Sample 2 | 0.40 | 7 | 24 | 718 |

PV Pore volume in pores of pore diameter in Angstroms determined by the test described by E.P. Barrett etc., J.A.C.S., Vol. 73, p. 373 et seq. (1951).
** SA Surface (meters square per gram) area determind by the method described above.

The hydrothermal stability of the ammonium exchanged zeolite of our invention is further illustrated by the retained crystallinity when subjected to the high temperature steaming conditions.

EXAMPLE 6

A sodium Y as in Example 1, was exchanged as in Example 1 to Na₂O content of the exchanged zeolite on a volatile free basis of 0.54%. It was calcined at 1000° F. for 3 hours. Samples of the calcined zeolite were exposed to steam at temperatures as shown in Table 4. The zeolite retained its crystallinity up to temperatures about 1250° F. over prolonged periods of time, and showed an X-ray pattern similar to that of the original uncalcined product. The lattice structure of the steamed zeolite as shown by their X-ray pattern, was retained substantially constant irrespective of the temperatures of steaming operations in the range of from about 1000° up to about 1250° F.

TABLE 4

| Temperature of Steaming ° F | Duration Hours | a₀ |
|---|---|---|
| 1050 | 6 | 24.37 |
| 1150 | 6 | 24.36 |
| 1250 | 6 | 24.35 |

The following examples are for the purpose of illustrating our discoveries as to the effect of the various parameters which control, and the results which may be obtained by employing our process of high temperature exchange of the zeolite, whose exchange sites are occupied by sodium. The data here presented is also illustrative of the useful variations in the parameters to produce stable ammonium exchanged sodium zeolites.

EXAMPLE 7

The procedures of Example 1, employing the Y zeolite of Example 1 was followed but the ratio of the equivalents of ammonium to the equivalents of sodium in the zeolite and the concentration of the ammonium ion were adjusted to give the specified ratios, in the seven different runs reported in the following Table 7. The Na Y employed had a surface area of 740 square meters per gram when measured by the above test.

TABLE 4

| Equiv. NH₄ per Equiv. Na on Zeolite VF | Equiv. of NH₄ liter of charge | Reaction Conditions Reactant Ratios Temp. ° F | % Solids | Product Na₂O % by weight on Product | Surface Area m²/gr. |
|---|---|---|---|---|---|
| 5 | 1.63 | 350° F | 6.6% | 1.96 | 589 |
| 10 | 3.3 | " | " | 1.94 | |
| 15 | 4.9 | " | " | 1.93 | 612 |
| 20 | 6.5 | " | " | 1.63 | |
| 25 | 8.1 | " | " | 1.26 | 655 |
| 30 | 9.8 | " | " | 1.11 | 636 |
| 40 | 13. | " | " | 0.52 | 627 |
| 168 | 11.8 | " | 1.5% | .52 | |

It will be observed that under the conditions of the above Example 7, the reduction to about 2% or less of Na₂O is attained when the ratio of the equivalents of NH₄ in the solution per equivalent of the Na in the zeolite is about 5, and that increasing the ratio of the equivalents results in a reduction of the Na₂O content. Above 40, an increase does not result in a further reduction. The reduction of the sodium to a level of 1% expressed as Na₂O is attained as is shown in the table and FIG. 1 when the ratio is above about 30.

The values of concentration of the NH₄ ion in the solution is a function of the said ratio and the concentration of zeolite solids, as well as the Na content of the zeolite. The experiment with a ratio of 168 shows that no substantial improvement is obtained in this example by increasing this ratio above about 40.

The preservation of the surface area by the process of our invention, is evidenced by the relatively small change in the surface area from the zeolite Y charged to the exchange process. The data shows that the exchange, by the process of our invention, results in substantial preservation of the crystallinity of the Y zeolite. The reduction in surface area from about 740 square meters per gram for the sodium Y zeolite charge to the process, to about 630 for the preferred conditions of 30 to 40 ratio of equivalents of ammonium cations to sodium cation, indicates a reduction of less than about 14% of the surface area of the sodium Y charged to the process.

EXAMPLE 8

The effect of temperature in the exchange reaction is illustrated in the following examples in which the procedures of Example 1 was followed, except that the temperature was different in each of the seven runs.

TABLE 5

| Temp. ° F | % Na$_2$O left in Zeolite |
| --- | --- |
| 250 | 1.98* |
| 300 | 1.38* |
| 350 | 0.52* |
| 400 | 0.77* |
| 450 | 0.74** |
| 500 | 0.87*** |

*Good crystallinity by X-ray diffraction, strong well shaped peaks of good intensity.
*Weak Y peaks of low intensity, partial destruction of crystallinity.
***No structure by X-ray.

The accuracy of the above analysis for Na$_2$O at levels of substantially less than 1% Na$_2$O is usually ± 0.2 and thus the exchange at temperatures above 400° F. may be taken as substantially equivalent.

The crystallinity, as measured by X-ray peak intensities of the samples produced at temperatures of 350° F. and less, is substantially the same as starting material. However, the product produced at 450° F. shows substantial destruction of crystallinity as shown by X-ray and no structure is apparent in the X-ray spectogram where the temperature of 500° F. was employed. The following experiment illustrates that the temperature above 450° F. is destructive of crystallinity whether the equivalents of ammonium to the equivalents of sodium is maintained at the high level of 40 equivalents, or at a much lower level.

Where the ratio of the equivalents of the NH$_4$ cation to the sodium cations is low, the temperature must be increased excessively in order to reduce the Na$_2$O to less than 1%.

EXAMPLE 9

In this example the procedure of Example 1 was followed to reduce the Na to less than 1% expressed as Na$_2$O, except that the slurry contained ammonium salt in a ratio of ammonium cation to sodium cation of substantially less than 40, but with the same zeolite solids in the slurry as in Example 1, and the temperature was adjusted for each of two runs reported in the following table. It is compared with the 40 equivalent tests of Table 4.

TABLE 6

| Equiv. of NH$_4$ Per Equiv. of Na | Equiv. of NH$_4$/liter | Temp. | % Na$_2$O in Product VF | Crystallinity |
| --- | --- | --- | --- | --- |
| 4 | 2.8 | 500 | 3.6 | Amorphous |
| 10 | 7 | 560 | 0.6 | Amorphous |
| 10 | 7 | 350 | 1.94 | Good |
| 40 | 13 | 350 | 0.52 | Good |

The effect of the time upon the extent of exchange is illustrated by the following example.

EXAMPLE 10

The process of Example 1 was carried out except that the reaction time was varied for each of the three runs reported in the following table.

TABLE 7

| Time in Hours | % Na$_2$O in Zeolite |
| --- | --- |
| 2 | 1.65 |
| 4 | 1.4 |
| 6 | 0.64 |

The above data illustrates the results which may be obtained by the procedure of our invention, whereby the exchange process is carried out at a high temperature in which a mixture of a sodium zeolite of the faujasite type, particularly Y, in which the Na is replaced by NH$_4$ in an acidified aqueous slurry of the zeolite, and in which the exchange process proceeds to replace substantially the entire sodium content of the zeolite in the slurry by an exchange at temperatures above the normal boiling point of the solution under autogenous pressures.

We have found that in order to reduce the sodium content of the zeolite expressed as Na$_2$O on a volatile free basis to about 1% or less by weight of the zeolite, the ratio of the NH$_4$ in the salt solution and the concentration of solid zeolite in the solution should be controlled so that the equivalents of NH$_4$ ion per equivalent of Na in the zeolite charged, be about 30 or more. For example, in the range of about 30 to about 40. The concentration of the ammonium salt in the solution or the concentration of the zeolite solids or both the concentration of the ammonium salt and the concentration of the solids in the slurry, are adjusted to give this ratio. The temperature of the reaction should be controlled to above 300° and less than 500° F., for example, in the range of about 350° to about 400° F., and the reaction is continued preferably to reduce the Na in the zeolite to about 1% or less, expressed as Na$_2$O on a volatile free basis.

The preferred condition for the exchange of the sodium Y is to charge the sodium Y to a reaction mixture of a water solution of an ammonium salt at a pH of 3.5 employing a concentration of the salt and the zeolite to establish a ratio of the equivalents of NH$_4$ ion in the solution, to the equivalents of Na in the zeolite charged of about 40, and heat the mixture to a temperature of about 350° F. and maintain the reaction mixture for a time sufficient to reduce the Na content of the zeolite to a value of less than about 1%, expressed as Na$_2$O on a volatile free basis. According to our tests, the time required is suitably about 6 hours. The duration of exchange and the ratio of equivalents and the slurry concentration and the temperature of exchange may be adjusted to produce the desired level of Na in the exchanged zeolite.

In this specification, except as specified, percentages are given on the weight basis.

Since samples of Y and purity of the materials vary, it may be found that the exact controls of concentration, time and temperature for best results may vary.

Small scale bench autoclave tests performed, according to the above examples, will determine the best parameters for producing a Y zeolite of good crystallinity and hydrothermal stability by reducing the sodium of the Y zeolite as described above.

While we have described our process employing an autoclave, it is understood that the process may be carried out in more than one stage and in more than one vessel, or continuously with suitable pressure control provided that the entire exchange process is carried out under the controlled conditions specified above.

The following examples illustrate the process for producing the catalysts of our invention.

A series of ammonium zeolites produced according to Example 1 were produced with the $Na_2O$ content as shown in Table 8 below, by controlling the time of exchange and the ratio of the equivalents as in Example 7.

The catalysts were formed by spray drying a precursor slurry formed of the ammonium zeolite with pseudoboehmite and clay.

The following samples were prepared by mixing the washed ammonium zeolite filter cake with a water dispersion of peptized pseudoboehmite as in the following Example 11.

EXAMPLE 11

The mixture was produced by dispersing the pseudoboehmite in the ratio of about 100 grams (volatile free basis) in a liter of water to which was added 9.5 ml of 100% formic acid. To the desired quantity of the peptized pseudoboehmite, as above, to produce the quantity of catalyst desired, the slurry of the pseudoboehmite of the above concentration is added ball clay and the acid treated halloysite and the mixture stirred vigorously to produce a homogeneous dispersion. To the slurry thus produced, is added the ammonium zeolite.

The ratio of components is suitably 19% zeolite, 18% pseudoboehmite, 16% acid treated halloysite and 50.5% ball clay all taken in a volatile free basis. The mixture was spray dried. The finished spray dried catalyst, collected as particles of 70 micron average diameter.

EXAMPLE 12

The following spray dried samples of the catalyst of our invention were prepared according to the above procedure, employing various ammonium Y zeolites prepared as in Example 1, of the crystallinity and $a_o$ as in Example 1, but in which the ratio of the ammonium ion in the exchange solution to the Na in the zeolite was adjusted to yield the different Na contents of the following samples (See Table 4).

Each of the samples were separately incorporated in the matrix, as described in Example 11, to give a series of samples 1-6. The samples were tested by the above test procedure to determine the S+ activity.

Table 8 gives the $Na_2O$ content of the zeolite incorporated in the catalyst and the S+ activity of the catalyst.

TABLE 8

| Sample | % $Na_2O$ | S+ % Conversion |
|---|---|---|
| 1 | 2.5 | 50. |
| 2 | 1.57 | 48. |
| 3 | 1.35 | 49. |
| 4 | 1 | 54. |
| 5 | 0.78 | 54. |
| 6 | 0.64 | 60. |

It is to be observed that considering the accuracy of the S+ test which is of the order of ± 3% conversion, the hydrothermal stability of the zeolite produced according to our invention within the range of 2.5% to 0.5% $Na_2O$, is largely independent of the Na content. The above example yields a catalyst with an average S+ activity of 52.7, a mean value of 52.7% and a standard deviation of 4.1.

The results shown in Table 8 are surprising in view of the prior art teaching that in order to obtain catalysts of improved thermal stability, as in the so-called ultra-stable catalysts, the Y zeolite must be exchanged to reduce the Na, expressed as $Na_2O$ to levels below about 1%.

EXAMPLE 13

A further comparison with an ammonium zeolite prepared from NaY such as used in Example 1, but exchanged at atmospheric reflux temperature with $NH_4NO_3$ to an Na content expressed as $Na_2O$ on a volatile free basis of 2.5% by weight, and formulated with the matrix as in Example 11 and 12. The S+ activity of the catalyst was 38%.

Instead of using clay and alumina as a matrix, other types of mixtures are used in the prior art may be used to produce catalysts like our invention. The following example illustrates such catalysts.

EXAMPLE 14

The wet, washed zeolite produced as in Example 1, was mixed with wet cake of silica-alumina gel (48% $SiO_2$ . 52% $Al_2O_3$ by weight on a volatile free basis) in the following proportions: 19% ammonium Y of Example 1; 18% pseudoboehmite; 40% silica-alumina gel; and 23% ball clay spray dried as in Example 12. The catalyst had an S+ activity of 58%.

EXAMPLE 15

Instead of using clay in the matrix, as in Example 14, it was replaced with silica-alumina gel and mixed and spray dried as in Examples 12 and 14. The composition of the catalyst precursor before spray drying was as follows: 19% ammonium zeolite; 18% pseudoboehmite and 63% silica-alumina gel. The spray dried catalyst had S+ activity of 58%.

We claim:

1. A method of producing a cracking catalyst of ammonium zeolites of the faujasite type which comprises mixing a zeolite of the faujasite type whose exchange position is substantially entirely occupied by Na cations with a solution of an ammonium salt, the quantity of the zeolite, and the concentration of the ammonium cations, being in quantity sufficient to establish a ratio of the equivalents of $NH_4$ cation in the solution, per equivalent of Na cation in the zeolite in the mixture in excess of about 5, heating the solution to a temperature above about 300° and less than about 450° F. for a period of time to reduce the sodium content of the zeolite, expressed as $Na_2O$, in the range of from about 2.5% to about 0.5% by weight of the exchanged zeolite, on a volatile free basis, and washing the zeolite substantially free of anions of the salt in solution, mixing said zeolite with a matrix in water to form a slurry and spray drying the slurry.

2. In the process of claim 1, in which said solution is acid of a pH being between about 2.5 and 5, and said equivalents of the $NH_4$ ion to the sodium ion in the zeolite being within the range of above about 30 up to about 40, for a period of time sufficient to reduce the Na in the zeolite, expressed as $Na_2O$, to less than 1% by weight of the zeolite on a volatile free basis.

3. The process of claim 1, in which the zeolite is an Na Y zeolite, and in which the ammonium zeolite produced has substantially all of said Na replaced by $NH_4$ cations, and in which the crystallinity of the ammonium zeolite is substantially the same as the Na zeolite which has been exchanged in the reaction.

4. In the process of claim 2, in which the zeolite is an Na Y zeolite, and in which the ammonium zeolites produced has substantially all of said Na replaced by $NH_4$ cations, and in which the crystallinity of the ammonium zeolite is substantially the same as the Na zeolite which has been exchanged in the reaction.

5. In the process of claim 1, in which said solution is acid at a pH being between about 3 and 4, and said equivalents of the $NH_4$ ion to the sodium ion in the zeolite being within the range of above about 30 up to about 40, and the temperature being between above 300° and less than about 450° F., for a period of time sufficient to reduce the Na in the zeolite, expressed as $Na_2O$, to less than 1% by weight of the zeolite on a volatile free basis.

6. The process of claim 5, in which the zeolite is an Na Y zeolite, and in which the ammonium zeolites produced has substantially all of said Na replaced by $NH_4$ cations, and in which the crystallinity of the ammonium zeolite is substantially the same as the Na zeolite which has been exchanged in the reaction.

7. A catalyst precursor slurry consisting essentially of about 10 to 30% by weight of the solids in a water slurry of ammonium zeolite, having an $a_o$ in the range of about 24.7% to about 24.5% and an Na content expressed as $Na_2O$ in the range of about 2.5% and about 0.5% by weight of the zeolite on a volatile free basis, about 20 to about 70% by weight of kaolin and about 10 to 30 parts by weight of peptized pseudoboehmite, said % based on the total weight of solids in the slurry on a volatile free basis.

8. The method of claim 1, in which said solution is acid of a pH being between about 2.5 and 5, and said equivalents of the $NH_4$ ion to the sodium ion in the zeolite being within the range of above about 30 up to about 40, and the temperature being between above 300° and less than about 450° F., for a period of time sufficient to reduce the Na in the zeolite, expressed as $Na_2O$, to less than 1% by weight of the zeolite on a volatile free basis.

9. The catalyst precursor of claim 7, in which the ammonium zeolite is produced by exchange with ammonium hydroxide of a Na Y zeolite, and in which the ammonium zeolites produced has substantially all of said Na replaced by $NH_4$ cations, and in which the crystallinity of the ammonium zeolite is substantially the same as the Na zeolite which has been exchanged in the reaction.

10. The catalyst precursor of claim, 9 in which said exchange occurs in a solution which is acid at a pH being between 3 and about 4, and the equivalents of the $NH_4$ ion to the sodium ion in the zeolite being within the range of above about 30 up to about 40, and the temperature being between above 300° and less than about 450° F., for a period of time sufficient to reduce the Na in the zeolite, expressed as $Na_2O$, to less than 1% by weight of the zeolite on a volatile free basis.

11. A catalyst precursor consisting essentially of about 10 to 80% by weight of a water slurry of ammonium zeolite, having an $a_o$ in the range of about 24.7 to about 24.5 and an Na content expressed as $Na_2O$ in the range of about 2.5% and about 0.5% by weight of the zeolite on a volatile free basis, about 20 to about 70% by weight of kaolin and about 10 to 30 parts by weight of alumina, said % based on the total weight of solids in the slurry on a volatile free basis, said catalyst having an S+ activity in excess of about 45%.

12. The catalyst precursor of claim 11 in which the sodium content of said ammonium zeolite expressed as $Na_2O$ is less than about 1%.

13. A cracking catalyst produced by the process which comprises mixing a zeolite of the faujasite type whose exchange position is substantially entirely occupied by Na cations with a solution of an ammonium salt, the quantity of the zeolite, and the concentration of the ammonium cations, being in quantity sufficient to establish a ratio of the equivalents of $NH_4$ cation in the solution, per equivalent of Na cation in the zeolite in the mixture in excess of about 5, heating the solution to a temperature above about 300° and less than about 450° F for a period of time to reduce the sodium content of the zeolite, expressed as $Na_2O$, in the range of from about 2.5% to about 0.5% by weight of the exchanged zeolite, on a volatile free basis, and washing the zeolite substantially free of cations of the salt in solution, mixing said zeolite with a matrix in water to form a slurry and spray drying the slurry.

14. The catalyst of claim 13, in which said solution is acid of a pH being between about 2.5 and 5, and said equivalents of the $NH_4$ ion to the sodium ion in the zeolite being within the range of above about 30 up to about 40, and the temperature being between above 300° and less than about 450° F., for a period of time sufficient to reduce the Na in the zeolite, expressed as $Na_2O$, to less than 1% by weight of the zeolite on a volatile free basis.

15. The catalyst of claim 13, in which the zeolite is an Na Y zeolite, and in which the ammonium zeolites produced has substantially all of said Na replaced by $NH_4$ cations, and in which the crystallinity of the ammonium zeolite is substantially the same as the Na zeolite which has been exchanged in the reaction.

16. The catalyst of claim 14, in which the zeolite is an Na Y zeolite, and in which the ammonium zeolites produced has substantially all of said Na replaced by $NH_4$ cations, and in which the crystallinity of the ammonium zeolite is substantially the same as the Na zeolite which has been exchanged in the reaction.

17. The catalyst of claim 13, in which said solution is acid at a pH being between about 3 and 4, and said equivalents of the $NH_4$ ion to the sodium ion in the zeolite being within the range of above about 30 up to about 40, and the temperature being between above 300° and less than about 450° F., for a period of time sufficient to reduce the Na in the zeolite, expressed as $Na_2O$, to less than 1% by weight of the zeolite on a volatile free basis.

18. The catalyst of claim 17, in which the zeolite is an Na Y zeolite, and in which the ammonium zeolites produced has substantially all of said Na replaced by $NH_4$ cations, and in which the crystallinity of the ammonium zeolite is substantially the same as the Na zeolite which has been exchanged in the reaction.

* * * * *